United States Patent

[11] 3,615,592

| [72] | Inventor | Marvin A. Peterson |
| | | Park Ridge, Ill. |
| [21] | Appl. No. | 716,317 |
| [22] | Filed | Mar. 27, 1968 |
| [45] | Patented | Oct. 26, 1971 |
| [73] | Assignee | Beatrice Foods Co. |
| | | Chicago, Ill. |

[54] INCORPORATING FAT IN MARSHMALLOW
13 Claims, No Drawings

| [52] | U.S. Cl. | 99/134, 99/128 |
| [51] | Int. Cl. | A23g 3/00 |
| [50] | Field of Search | 99/118, 134, 139 |

[56] References Cited
UNITED STATES PATENTS

| 1,859,240 | 5/1932 | Jordan | 99/134 |
| 3,278,314 | 10/1966 | Colby et al. | 99/128 |
| 3,366,494 | 1/1968 | Bower et al. | 99/139 X |

OTHER REFERENCES

Nash, N. H. and Babayan, V. K., " Polyglycerol Esters— A New Development in the Field of Food Emulsifiers," The Bakers Digest, October, 1963, pp. 72– 75.

*Primary Examiner*—A. Louis Monacell
*Assistant Examiner*—J. M. Hunter
*Attorney*—Cushman, Darby & Cushman

ABSTRACT: Polyglycerol higher fatty acid partial esters, preferably polyglycerol partial stearates, are employed to emulsify a marshmallow mixture. The use of such emulsifier permits the addition of fat. The polyglycerol partial stearates permit the aeration of the mixture in a warm system. The aerated marshmallow mixture can be blended or layered with peanut butter, e.g. by swirling or layering horizontally or vertically to produce a product having reduced migration of water from the marshmallow to peanut butter.

INCORPORATING FAT IN MARSHMALLOW

The present invention relates to an improved marshmallow mixture and to its use in making a peanut butter and marshmallow combination.

Problems are encountered in incorporating aerating agents into warm marshmallow forming systems. Furthermore fats are normally not compatible with marshmallow systems.

Marshmallows are normally aerated in a system containing gelatin or albumen. Peanut butter generally has a large amount of oil, e.g. about 50 percent, and it is therefore difficult to combine it, e.g. in layered fashion, with marshmallow that has been aerated in an albumen, gelatin or agar system.

It is an object of the present invention to improve the compatibility of peanut butter and marshmallow and more especially to reduce the migration of water from the marshmallow to the peanut butter in such a combination.

Another object is to incorporate fat into a marshmallow system.

An additional object is to incorporate into marshmallow a whipping agent which will aerate the marshmallow mixture while it is warm.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by aerating a marshmallow mixture in the warm condition with a polyglycerol higher fatty acid partial ester as an emulsifier. A fat is employed as a carrier for the partial ester. In turn the partial ester permits the fat to enter the marshmallow system to impart a richness not normally present in marshmallow.

While the polyglycerol higher fatty acid partial ester can have more hydrophobic than hydrophilic groups, e.g. decaglycerol decastearate, preferably it has more hydrophilic than hydrophobic groups. The preferred partial ester is decaglycerol tristearate. Other suitable partial esters are triglycerol monostearate, decaglycerol tripalmitate, hexaglycerol distearate, triglycerol monoshortening (triglycerol monoester of the acids of cottonseed oil), hexaglycerol monoshortening, decaglycerol trishortening, diglycerol monostearate, decaglycerol hexapalmitate, decaglycerol diarachinate, triglycerol monobehenate, decaglycerol trilignocerate, decaglycerol tetramyristate, decaglycerol triester of hydrogenated cottonseed oil acids.

While polyglycerol esters from diglycerol to triconto glycerol (30 glycerol units partial esters of fatty acid can be employed there are preferably used triglycerol to decaglycerol esters of higher fatty acids, e.g. containing 12 to 22 carbon atoms in the fatty acid.

Unsaturated partial esters such as decaglycerol trioleate are preferably avoided since they will not aerate the marshmallow mix in a warm system. Aeration of the marshmallow mix is normally carried out at 90° to 150° F. preferably at not over 135° F. and most preferably at 100°–105° F. Temperatures much below 100° F. are usually unsatisfactory because the fats set up and make it more difficult to aerate the marshmallow mixture. With liquid fats, however, temperatures as low as 70° F., i.e. room temperature can be employed. As used in the specification and claims the term warm indicates a temperature of about 90° to 150° F.

As the fat which is employed as a carrier there can be employed butter, coconut oil, cottonseed oil, hydrogenated cottonseed oil, peanut oil, hydrogenated peanut oil, soybean oil, hydrogenated soybean oil, lard, safflower oil, corn oil, hydrogenated corn oil, olive oil, hydrogenated coconut oil, e.g. hydrogenated to a melting point of 90° F.

The marshmallow mixture itself can be any conventional marshmallow mixture. Such mixtures usually contain sucrose with or without corn syrup and a small amount of gelatin, albumen or agar.

Unless otherwise indicated all parts and percentages are by weight.

Typical basic marshmallow formulations which can be employed are set forth in examples A to H below.

EXAMPLE A

| | |
|---|---|
| Gelatin (250 Bloom) | 1.8 parts |
| Water | 22.0 parts |
| Sucrose | 45.72 parts |
| Corn syrup | 30.48 parts |

EXAMPLE B

| | |
|---|---|
| Gelatin | 2.5 parts |
| Water | 7.25 parts |
| Corn Syrup (54 DE about 81.5% solids) | 37.5 parts |
| Dextrose | 10.0 parts |
| Sucrose | 22.5 parts |

EXAMPLE C

| | |
|---|---|
| Dextrose (90% solids) | 300 lbs. |
| Amioca starch (88% solids) | 50 lbs. |
| Sucrose | 700 lbs. |
| Corn Syrup (54 DE about 81.5% solids) | 780 lbs. |
| Gelatin (90% solids) | 38 lbs. |
| Water | 22 gallons |

EXAMPLE D

| | |
|---|---|
| Corn syrup (54 DE about 81.5% solids) | 1080 parts |
| Amioca starch | 75 parts |
| Sucrose | 800 parts |
| Gelatin | 50 parts |
| Water | 200 parts |

EXAMPLE E

| | |
|---|---|
| Corn Syrup | 960 parts |
| Sucrose | 930 parts |
| Gelatin | 50 parts |
| Water | 200 parts |

EXAMPLE F

| | |
|---|---|
| Gelatin | 1 part |
| Water | 2.67 part |
| Sucrose | 5.6 part |
| Corn syrup (Karo) | 5.33 part |

EXAMPLE G

| | |
|---|---|
| Gelatin | 2 tablespoons |
| Water | 1¼ cup |
| Sucrose | 2 cups |

EXAMPLE H

| | |
|---|---|
| Invert Sugar | 68 parts |
| Sucrose | 3 parts |
| Water | 29 parts |
| Egg Albumen (dried) | 2 parts |

While there can be employed in the present invention high solids marshmallow formulations such as those containing 13 to 19 percent water as set forth in Doumak U.S. Pat. No.

2,847,311 preferably the marshmallow formulation contains 60–80 percent solids, most preferably 75 percent solids.

On a solids basis the marshmallow mixture of the present invention contains

- sugars (sucrose and/or dextrose and/or corn syrup) 84 to 98 percent
- gelatin (and/or albumen and/or agar) 0.5 to 10 percent
- polyglycerol partial fatty acid ester 0.33 to 2 percent
- fat 1 to 14 percent There can also be added vanilla and salt to taste as well as any desired food colors.

The system is also compatible with high-fat and low-fat cocoa and hence chocolate-flavored marshmallows can be prepared if desired. Likewise banana-flavored marshmallows can be made as well as marshmallows with other flavors. In general the amount of fat is greater than the amount of polyglycerol ester (usually at least five times as great). The amount of gelatin or the like is generally not over 6 percent and usually not over 2 percent.

The general procedure for making marshmallows according to the invention is to make a solution in water of the sucrose, corn syrup, gelatin and if desired vanilla and salt. The mixture is heated until it dissolves. Heating can be from 120° F. to the boiling point and is preferably at least 150° F. Then the melted fat and emulsifier are added. Sufficient time is allowed for the polyglycerol partial ester emulsifier to hydrate, the mixture is cooled to 150° F. or below, preferably 90° to 135° F. as stated and then aerated in a closed system with a nontoxic inert gas, e.g. nitrogen or compressed air until the desired specific gravity is reached. The preferred specific gravity is 0.5.

Example 1

| | |
|---|---|
| Sucrose | 21.10 |
| High maltose corn syrup | 56.80 |
| Gelatin (250 Bloom) | 1.0 |
| Water | 15.35 |

The sucrose, corn syrup and water were heated to 175° F. until the sugar and corn syrup dissolved. The resulting solution had 75 percent solids (the balance of the water in addition to that added directly came primarily from the corn syrups). Then there was added 0.6 part of decaglycerol tristearate in 5.15 parts of a fat which consisted of 5 parts hard butter (Kaomel) and 0.15 parts of stearin. The decagylcerol tristearate was allowed to hydrate and the mixture cooled to 100° F. and aerated with compressed air until a specific gravity of 0.5 was reached. The mixture was then cooled to room temperature. It had a richness due to the fat not normally present in marshmallow.

As previously indicated the marshmallow of the present invention is particularly suitable for use with peanut butter since the migration of the water from the marshmallow into the peanut butter is reduced due to the use of the emulsifier and fat.

The peanut butter and marshmallow are not normally in intimate admixture but instead are stratified in contacting layers. The layers can be either vertical or horizontal or they can be swirled, e.g. to give a vertically disposed spiral design. Thus a jar can be filled with alternating horizontal layers of peanut butter and marshmallow from two supply hoppers.

The volume of peanut butter to marshmallow can be from about 25:75 to about 95:5 but this is not a critical limitation.

Any conventional peanut butter can be employed such as that shown in Colby U.S. Pat. No. 3,278,314, example 1, for example or any commercially available peanut butter such as Shedd-Bartush, Skippy, Peter Pan, etc.

A particularly preferred peanut butter formulation is a conventional peanut butter to which there has been added a water-in-oil emulsifier in contrast to the oil-in-water emulsifiers normally employed in making peanut butter.

Specific examples of suitable peanut butter formulations are set forth below.

Example I

| | | |
|---|---|---|
| Peanuts | 90.1 | parts |
| Sodium chloride | 1.4 | parts |
| Dextrose | 3.5 | parts |
| Partially hydrogenated vegetable oil (I.V. 70–75) | 3.1 | parts |
| Substantially completely hydrogenated vegetable oil (I.V. 8) | 1.9 | parts |

Example II

| | | |
|---|---|---|
| Peanuts | 94.1 | parts |
| Salt | 1.4 | parts |
| Dextrose | 3.5 | parts |
| Span 60 (Sorbitan stearate) | 1.0 | parts |

Example III

| | | |
|---|---|---|
| Ground peanuts | 93.1 | parts |
| Salt | 1.4 | parts |
| Dextrose | 3.5 | parts |
| Centraphil IM (lecathin high in cephalin and also containing lipositol and inositil phosphatides) | 2.0 | parts |

Example IV

| | | |
|---|---|---|
| Ground peanuts | 93.1 | parts |
| Salt | 1.4 | parts |
| Dextrose | 3.5 | parts |
| Decaglycerol decastearate | 2.0 | parts |

Example V

| | | |
|---|---|---|
| Ground peanuts | 92.6 | parts |
| Salt | 1.4 | parts |
| Dextrose | 3.5 | parts |
| Myverol 1807 (mono and diglyceride mixture) | 2.5 | parts |

Example VI

| | | |
|---|---|---|
| Ground peanuts | 277.8 | parts |
| Salt | 4.2 | parts |
| Dextrose | 10.5 | parts |
| Myverol 1807 | 1.5 | |
| Centraphil IM | 6.0 | parts |

The marshmallow prepared in example I was successfully horizontally layered with each of the six peanut butter formulations in examples I through VI using about 70 percent peanut butter to 30 percent marshmallow in the jars. In addition to the advantages previously noted, incorporation of the fat retards the setting up of the gelatin, and hence, makes it easier to work with the marshmallow composition.

While the presently preferred composition is a related peanut butter and marshmallow composition and can also be prepared with marshmallow and jam or jelly composition utilizing the same proportions as with peanut butter. As examples with jelly and jams, there can be employed apple jelly, apply-grape jelly, grape jelly, blackberry jam, strawberry jam, peach preserves, apricot preserves, and orange marmalade.

As used in the claims, the term "jelly" is intended to be generic to jelly, jam, preserves and marmalade.

In place of the peanut butter, there also can be employed either butter or margarine.

What is claimed is:

1. A composition which is marshmallow containing 1 to 14 percent based on the total solids of a fat and 0.33 to 2 percent of the total solids of a polyglycerol higher fatty acid partial ester and being in an amount less than the amount of fat, said fat being a carrier for the partial ester and said partial ester permitting the fat to enter the marshmallow system and peanut butter in juxtaposition to the marshmallow, said partial ester improving the compatibility of the marshmallow with the peanut butter and reducing the migration of water from the marshmallow to the peanut butter.

2. Marshmallow according to claim 1 wherein the polyglycerol ester is an ester of a saturated fatty acid.

3. Marshmallow according to claim 2 wherein the saturated fatty acid ester is an ester of a fatty acid having 16 to 18 carbon atoms.

4. A marshmallow according to claim 3 wherein the fatty acid ester is a tri to decaglycerol stearate having more free hydroxyl groups than esterified hydroxyl groups.

5. A product according to claim 4 containing about 21 parts sucrose, about 57 parts corn syrups, about 1 part gelatin, about 15 parts water, about 0.6 part decaglycerol tristearate and about 5 parts fat.

6. A process of preparing marshmallow of claim 2 comprising adding the mixture of fat and polyglygcerol partial ester to a warm marshmallow mixture containing at least one sugar, water and a member of the group consisting of gelatin, albumen and agar.

7. A process according to claim 6 wherein the saturated fatty acid ester is a palmitate or stearate.

8. A process according to claim 7 wherein the fat is between 1 and 10 percent of the total composition and the polyglycerol ester is 0.25 to 1.5 percent of the total composition and is decaglycerol tristearate or triglycerol monostearate.

9. A product according to claim 1 wherein the fat is 1 to 10 percent of the total marshmallow composition and the ester is a palmitate or stearate and is present in an amount of 0.25 to 1.5 percent of the total marshmallow composition.

10. A product according to claim 1 wherein the fatty acid ester is a tri to decaglycerol stearate having more free hydroxyl groups than esterified hydroxyl groups.

11. A product according to claim 10 wherein the polyglycerol ester is triglycerol monostearate or decaglycerol tristearate.

12. A product according to claim 11 wherein the polyglycerol ester is decaglycerol tristearate and is present in an amount of 0.6 percent of the marshmallow composition and the fat is 5 percent of the marshmallow composition.

13. A composition according to claim 1 wherein the marshmallow has a specific gravity of 0.5.